(12) United States Patent
Sathyanarayana

(10) Patent No.: US 8,175,362 B2
(45) Date of Patent: May 8, 2012

(54) DISPLAY OF CLASSIFIER OUTPUT AND CONFIDENCE MEASURE IN AN IMAGE

(75) Inventor: Shashidhar Sathyanarayana, Pleasanton, CA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 848 days.

(21) Appl. No.: 12/253,471

(22) Filed: Oct. 17, 2008

(65) Prior Publication Data

US 2009/0103794 A1    Apr. 23, 2009

Related U.S. Application Data

(60) Provisional application No. 60/981,417, filed on Oct. 19, 2007.

(51) Int. Cl.
  *G06K 9/00* (2006.01)
  *G06K 9/62* (2006.01)
(52) U.S. Cl. .................................... 382/131; 382/224
(58) Field of Classification Search .................. 382/128, 382/130–132, 224
See application file for complete search history.

(56) References Cited

U.S. PATENT DOCUMENTS

| | | | |
|---|---|---|---|
| 4,736,751 A | 4/1988 | Gevins et al. | |
| 5,003,979 A | 4/1991 | Merickel et al. | |
| 5,280,265 A | 1/1994 | Kramer et al. | |
| 5,570,430 A | 10/1996 | Sheehan et al. | |
| 5,590,218 A | 12/1996 | Ornstein | |
| 6,058,322 A | 5/2000 | Nishikawa et al. | |
| 6,198,839 B1 | 3/2001 | Kuan et al. | |
| 6,430,430 B1 | 8/2002 | Gosche | |
| 6,611,206 B2 | 8/2003 | Eshelman et al. | |
| 6,858,007 B1 | 2/2005 | Akselrod et al. | |
| 7,194,301 B2 | 3/2007 | Jenkins et al. | |
| 7,223,234 B2 | 5/2007 | Stupp et al. | |
| 7,356,172 B2 * | 4/2008 | Fan et al. | 382/128 |
| 7,392,199 B2 | 6/2008 | Karlov et al. | |
| 7,912,528 B2 * | 3/2011 | Krishnan et al. | 600/407 |
| 2002/0076091 A1 | 6/2002 | Wang | |
| 2002/0097902 A1 | 7/2002 | Roehrig et al. | |
| 2004/0193068 A1 | 9/2004 | Burton et al. | |
| 2004/0221855 A1 | 11/2004 | Ashton | |
| 2005/0010106 A1 | 1/2005 | Lang et al. | |
| 2005/0238253 A1 | 10/2005 | Behrenbruch et al. | |
| 2006/0064037 A1 | 3/2006 | Shalon et al. | |
| 2006/0122467 A1 | 6/2006 | Harrington et al. | |
| 2006/0228015 A1 | 10/2006 | Brockway et al. | |
| 2007/0004969 A1 | 1/2007 | Kong et al. | |
| 2008/0109041 A1 | 5/2008 | de Voir | |

FOREIGN PATENT DOCUMENTS

| | | | |
|---|---|---|---|
| WO | WO-99/04329 A2 | 1/1999 | |
| WO | WO-2008/005513 A2 | 1/2008 | |

* cited by examiner

*Primary Examiner* — Irakli Kiknadze
(74) *Attorney, Agent, or Firm* — Frommer Lawrence & Haug LLP; Bruce E. Black

(57) ABSTRACT

Systems and methods are described for displaying classifier output and confidence measure in an image. The confidence measure advantageously provides additional information to the user indicating the accuracy of the classification result. Based on the classification accuracy, the user may accept or reject the classification result. In an exemplary embodiment, the classifier output is displayed on the image by color coding regions in the image based on their classifications. The confidence measure is displayed by adjusting the transparencies of the color coded regions according to their confidence measures. In one embodiment, only the classifications having confidence measures above a threshold are displayed. In other embodiments, the classifier output and confidence measure may be displayed separately, contour lines may be drawn through image regions having similar confidence measures, and the confidence measure may be displayed for a region under a pointer that the user can move within the image.

18 Claims, 3 Drawing Sheets

DISPLAY OF CLASSIFIER OUTPUT AND CONFIDENCE MEASURE IN AN IMAGE

RELATED APPLICATIONS

This application claims the benefit of U.S. Provisional Patent Application Serial No. 60/981,417, filed Oct. 19, 2007, which is incorporated herein by reference.

FIELD OF THE INVENTION

The field of the invention relates to classifiers, and more particularly, to systems and methods for displaying classifier output and confidence measure in an image.

BACKGROUND

In the field of pattern recognition, classifiers are used to classify an object into one of a number of predefined classes or categories. Applications for classifiers include speech recognition, face recognition, image processing, and medical diagnosis.

Classifiers are used in image processing to classify pixels or regions in an image into one of a number of predefined classes. For example, a classifier may be used to classify regions in an image of natural scenery into one of a number of classes such as leaves, grass, or sky. In the medical field, classifiers are used to classify regions in images of patients into different types of tissue, for example, abnormal or diseased tissue and normal tissue.

A classifier can be customized for a particular classification problem by training the classifier to identify particular classes. This usually involves a "training" process, in which a generic classifier is presented with a large number of example image regions of each category or class. The classifier extracts features (also known as patterns) associated with each image region and "learns" to associate these features (patterns) with the known category or class of the region. The learning processing can be, for example, one in which parameter values in a mathematical model are adjusted until the classifier ideally produces the correct class for each training input. Once the classifier has been trained to identify the classes, the classifier can be used to classify new input image regions by applying the previously learned associations.

In most practical applications, for a given input image region, the output of the classifier is at best correct only in a statistical sense. Errors are inevitable in real world classification problems. The overall accuracy of a classifier can be stated by computing a percentage of training inputs that are correctly classified.

In the medical field, classification is used to classify tissues in medical images, e.g., an intravascular ultrasound (IVUS) image. FIG. 1a shows an example of an imaging transducer assembly 1. The imaging transducer 1 is typically within the lumen 10 of a guidewire (partially shown), having an outer tubular wall member 5. To obtain an image of a blood vessel, the imaging transducer assembly 1 may be inserted into the vessel. The transducer assembly 1 may then rotate while simultaneously emitting energy pulses, e.g., ultrasound waves, at portions of the vessel from within the vessel and receiving echo or reflected signals.

Turning to FIG. 1b, it is known in the art that an imaging console 20 having a display screen, a processor and associated graphics hardware (not shown) may be coupled with the imaging transducer assembly 1 to form a medical imaging system 30. The imaging console 20 processes the received echo signals from the imaging transducer assembly 1 and forms images of the area being imaged. To form the images, the imaging console 20 draws multiple lines, known as "radial lines" (not shown) on the display screen that each correspond to an angular position of the transducer assembly 1. The processor of the imaging console 20 assigns brightness values to pixels of the lines based on magnitude levels of the echo signals received from the transducer assembly 1 at the angular positions corresponding to the lines. A drawing that includes a large number of these radial lines results in an image such as an intravascular ultrasound (IVUS) image (not shown). Such an image may show, among other things, the texture of the area being imaged, such as the smoothness or the roughness of the surface of the area being imaged.

SUMMARY

Described herein are systems and methods for displaying classifier output and confidence measure in an image. The confidence measure advantageously provides additional information to the user indicating the accuracy of the classification result. Based on the classification accuracy, the user may accept or reject the classification result, use another classification method and/or other methods to evaluate the patient.

In an exemplary embodiment, the classifier output is displayed on the image by color coding regions in the image based on their classifications. The confidence measure is displayed by adjusting the transparencies of the color coded regions according to their confidence measures. In one embodiment, only the classifications having confidence measures above a threshold are displayed. In other embodiments, the classifier output and confidence measure may be displayed separately, contour lines may be drawn through image regions having the same or similar confidence measures, and the confidence measure may be displayed for a region under a pointer that the user can move within the image, e.g., using a touch pad.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1A:
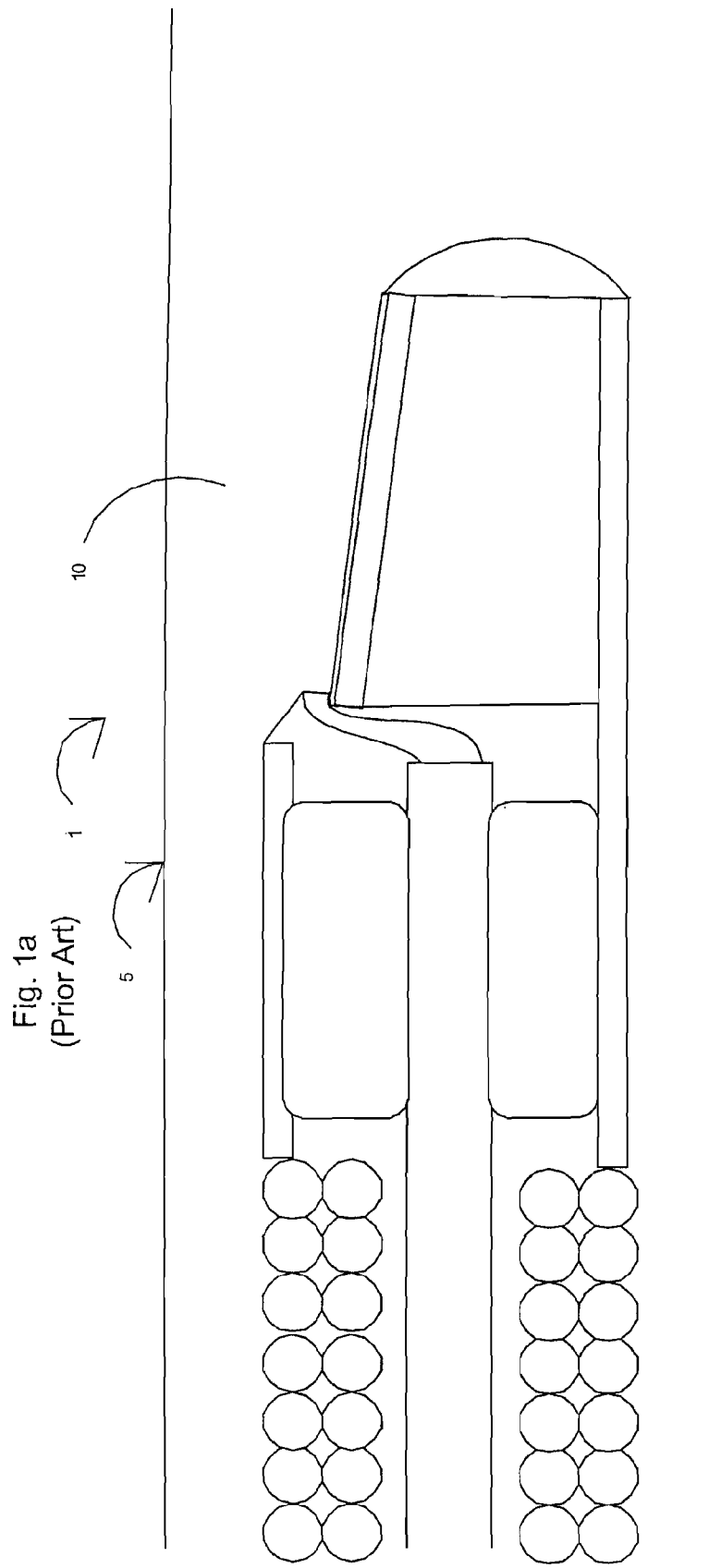
FIG. 1a is a cross-section view of an imaging transducer assembly.
Figure 1B:
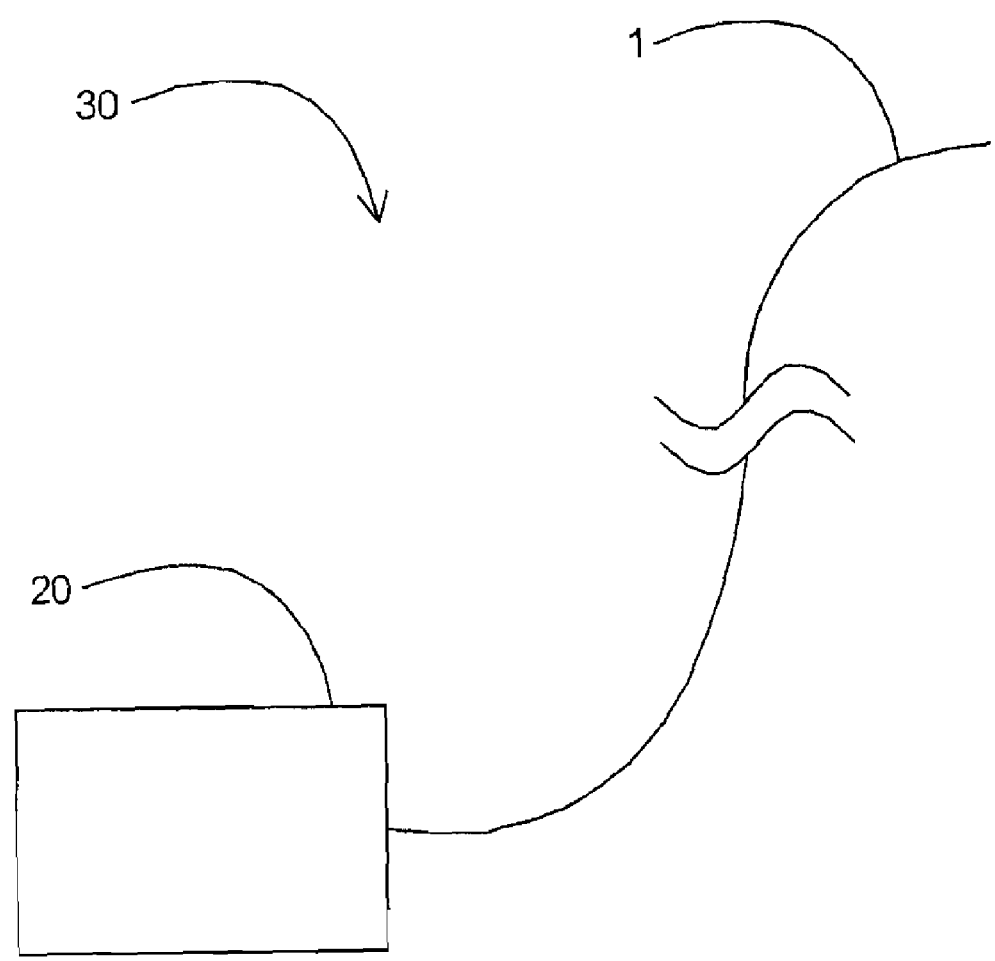
FIG. 1b is a block diagram of a medical imaging system.

Described herein are systems and methods for displaying classifier output and confidence measure in an image.

The image may be a medical image, e.g., an ultrasound, OCT or MRI image, or other type of image. For example, a medical image of a patient's body may be classified, in which regions of the image are classified into one of a number of predetermined classes or categories, e.g., healthy tissue, abnormal tissue, or the like. The regions of the image may then be color coded based on their classifications generating a classified image. The classified image may be used for medical diagnosis to aid a physician in identifying, e.g., abnormal tissue, in the image. Each image region may comprise one or more pixels.

Examples of classifiers that may be used include Bayesian classifiers, k-nearest neighbor (k-NN) classifiers, and neural network classifiers.

A k-NN classification involves identifying k samples of known classes or categories that are the k nearest neighbors to the input image region in the feature space. The input image region may then be classified based on the class of a majority of its k nearest neighbors. For example, if k=1, then an input image region may be classified based on the class of its nearest neighbor. If k=5, then an input image region may be classified based on the class of a majority of its five nearest neighbors. The k value may be any positive integer.

A confidence measure may be computed for a k-NN classification of an input image region indicating the confidence that the classification is correct. The confidence measure may be based on the classes of the k nearest neighbors to the input image region. For example, if all of the k nearest neighbors belong to the same class, then there is a high confidence that the classification of the input image region is correct. If the k nearest neighbors belong to different classes, then the confidence of the classification is lower. For example, if k=5, four of the nearest neighbors belong to class A and one of the nearest neighbors belongs to class B, then there is a lower confidence that the input image region is correctly classified as class A compared with the case where all five nearest neighbors belong to class A. The confidence measure in which all five nearest neighbors belong to the same class may be represented as 100%, while the confidence measure in which four of the five nearest neighbors belong to the same class may be represented as 80%. Other known methods may be used to compute the confidence measure of a classification. For example, the contribution of each nearest neighbor to the confidence measure may be weighted based on the proximity of the nearest neighbor to the input image region in the feature space.

Although examples of k-NN classifications were given above, any type of image classification and confidence measure may be used.

In an exemplary embodiment of the invention, both the classification output and confidence measure are displayed on an image, e.g., a grayscale or monochrome ultrasound image. In this embodiment, the classifications of different regions in the image may be shown by color coding the regions based on their classifications. The confidence measure for each classification may also be displayed on the image by adjusting the transparency of the corresponding color coded region. For example, if the confidence measure for an image region is high, then the transparency of the color coded region may be low with the color coded region appearing as a solid color. If the confidence measure for the image region is low, then the transparency of the color coded region may be high with more of the grayscale image showing through the color coded region. For confidence measures between high and low confidence, the transparency of the corresponding color coded region may be adjusted accordingly with lower transparency for higher confidence and higher transparency for lower confidence.

Figure 2:
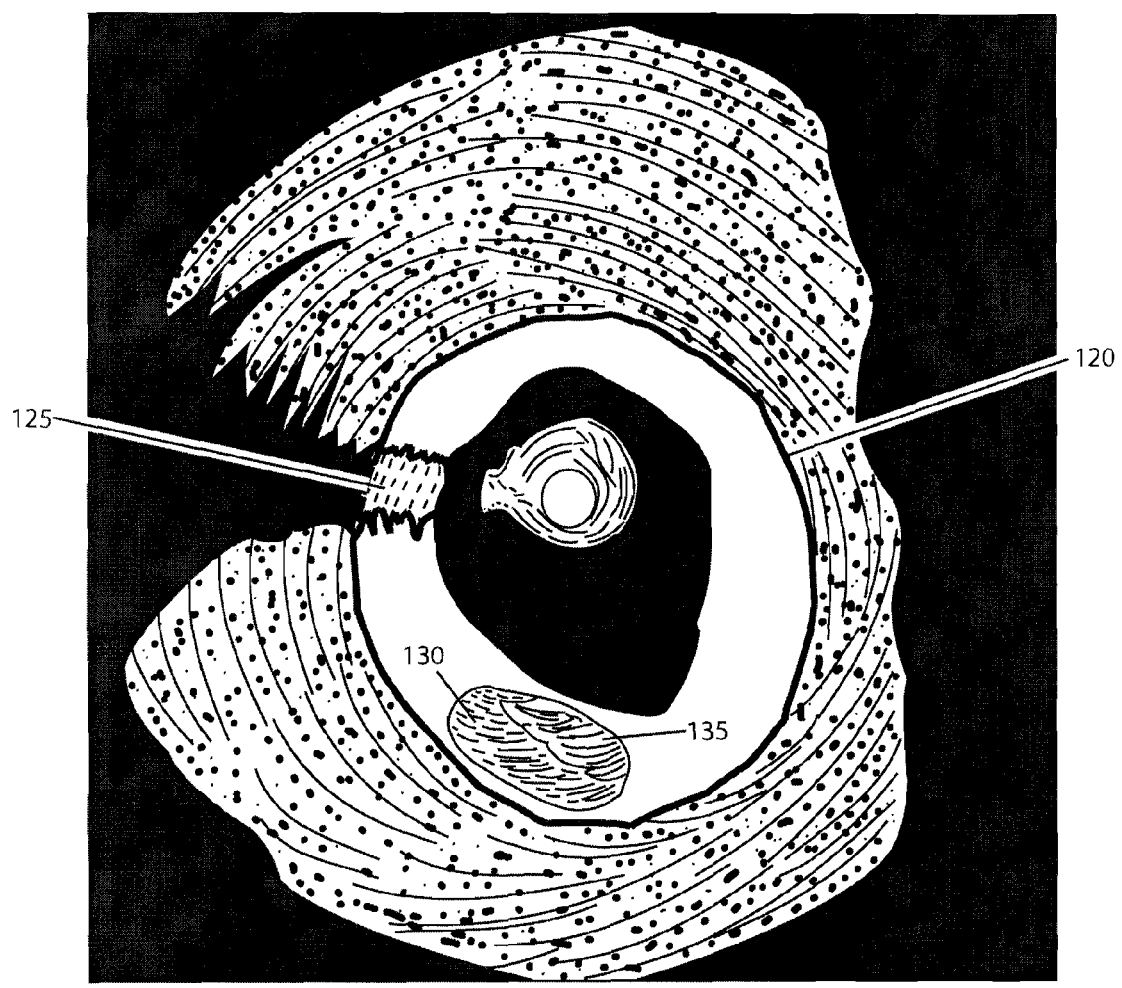
FIG. 2 is a schematic example of classifier output and confidence measure displayed on an IVUS image, according to one embodiment of the invention.

FIG. 2 shows an example of classifier output and confidence measure displayed on an IVUS image 110 of a blood vessel. In this example, regions of the image 110 are classified as fibrotic tissue 120 (e.g., color coded green) and lipidic tissue 130 (color coded yellow). This example shows an area 125 where the confidence measure of the fibrotic classification is low. Within this area 125, the transparencies of the green color coded regions are high indicating low confidence. Similarly, this example shows an area 135 where the confidence measure of the lipidic tissue classification is low. Within this area 135, the transparencies of the yellow color coded regions are high indicating low confidence.

In another exemplary embodiment, only classifications for regions having confidence measures above a predetermined threshold are shown. For example, if the classification of an image region has a confidence measure that is below the threshold, then the classification, e.g., color coded region, is not shown. For classifications above the threshold, the corresponding color coded regions may be solid colors or have their transparencies adjusted according to their confidence measures. The threshold may also be a user selected threshold.

In another exemplary embodiment, two separate windows may be used for the classifier output and the confidence measure. For example, one window may show the image in which regions of the image are color coded according to their classifications. The color coded regions may be solid colors. The other window may show the confidence measures for the classifications by adjusting the intensity levels of the corresponding regions of the grayscale image. For example, an image region corresponding to a high confidence may remain bright while an image region corresponding to a low confidence may be dimmed. An image region corresponding to a very low confidence may appear black or near black. The two windows may be displayed on the same screen or separate screens.

In yet another exemplary embodiment, contour lines may be added to the image to indicate the confidence measure of different image regions. For example, the regions of the image may be color coded according to their classifications. Contour lines are added to the image with each contour line running through image regions having the same confidence measure or confidence measures that are close. Thus, each contour line indicates regions having the same or similar confidence measures. Each contour line may form a closed loop.

In still another exemplary embodiment, the user may move a pointer within the image using a touch pad or mouse to read the confidence measure for a particular region. In this embodiment, the confidence measure for the region under the pointer may be displayed next to the pointer as a numerical value and/or symbol. In another embodiment, the confidence measure around the pointer may be shown by adjusting the transparencies of the color coded regions within an area around the pointer.

The display may include additional confidence information such as the maximum confidence measure in the image, the minimum confidence measure in the image, and/or the average confidence measure of the image. The additional confidence information may be displayed in a table on the screen.

In the foregoing specification, the invention has been described with reference to specific embodiments thereof. It will, however, be evident that various modifications and changes may be made thereto without departing from the broader spirit and scope of the invention. For example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A method for displaying an ultrasound image, comprising:
 classifying regions of the ultrasound image, wherein each region is classified into one of a plurality of classes;
 determining a confidence measure for each of the classified regions; and
 displaying, on the ultrasound image, the classification and confidence measure for at least one of the regions including displaying contour lines on the image to indicate the confidence measure.

2. The method of claim 1, wherein displaying the classification comprises color coding at least one of the classified regions of the image based on the corresponding class.

3. The method of claim 2, wherein displaying the confidence measure comprises adjusting a transparency of each color coded region based on the corresponding confidence measure.

4. The method of claim 3, wherein adjusting the transparency comprises making the color-coded region less transparent for a higher confidence measure.

5. The method of claim 2, wherein displaying the confidence measure comprises displaying the confidence measure when a pointer is within the region.

6. The method of claim 1, wherein displaying the classification and confidence measure comprises displaying the classification and confidence measure of a region only if the confidence measure of that region is at or above a threshold.

7. The method of claim 6, wherein displaying the classification comprises color coding at least one region of the image with a confidence measure that is at or above the threshold.

8. The method of claim 7, wherein displaying the confidence measure comprises adjusting a transparency of each color coded region based on the corresponding confidence measure.

9. The method of claim 1, wherein displaying the classification and confidence measure comprises displaying the classification as color coding in at least one classified region of a first image based on the corresponding class and displaying the confidence measure of at least one classified region by adjusting an intensity level of the region in a second image based on the confidence measure.

10. A system for displaying an ultrasound image, comprising:
 a display;
 at least one processor in communication with the display; and
 a non-transitory computer readable storage medium having processor-executable instructions, the processor-executable instructions when installed onto the system enables the system to perform actions, comprising:
  classify regions of the ultrasound image, wherein each region is classified into one of a plurality of classes;
  determine a confidence measure for each of the classified regions; and
  display, on the ultrasound image generated on the display, the classification and confidence measure for at least one of the regions including displaying contour lines on the image to indicate the confidence measure.

11. The system of claim 10, further comprising an image source.

12. The system of claim 11, wherein the image source is an ultrasound device configured and arranged to generate ultrasound images.

13. The system of claim 10, wherein displaying the classification comprises color coding at least one classified region of the image based on the corresponding class.

14. The system of claim 13, wherein displaying the confidence measure comprises adjusting a transparency of each color coded region based on the corresponding confidence measure.

15. The system of claim 10, wherein displaying the classification and confidence measure comprises displaying the classification and confidence measure of a region only if the confidence measure of that region is at or above a threshold.

16. A non-transitory computer readable storage medium having processor-executable instructions, the processor-executable instructions when installed onto a system enable the system to perform actions, comprising:
 classify regions of an ultrasound image, wherein each region is classified into one of a plurality of classes;
 determine a confidence measure for each of the classified regions; and
 display, on the ultrasound image, the classification and confidence measure for at least one of the regions on the image including displaying contour lines on the image to indicate the confidence measure.

17. The non-transitory computer readable storage medium of claim 16, wherein displaying the classification comprises color coding at least one classified region of the image based on the corresponding class.

18. The non-transitory computer readable storage medium of claim 17, wherein displaying the confidence measure comprises adjusting a transparency of each color coded region based on the corresponding confidence measure.

* * * * *